(12) United States Patent
Papajewski et al.

(10) Patent No.: US 9,150,222 B2
(45) Date of Patent: Oct. 6, 2015

(54) METHOD AND DEVICE FOR DETERMINING A PREDICTION QUALITY FOR A PREDICTED ENERGY CONSUMPTION OF A MOTOR VEHICLE

(71) Applicant: AUDI AG, Ingolstadt (DE)

(72) Inventors: Jens Papajewski, Unterhausen (DE); Michael Hamacher, Ingolstadt (DE); Helena Mussner, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/382,504

(22) PCT Filed: Feb. 23, 2013

(86) PCT No.: PCT/EP2013/000531
§ 371 (c)(1),
(2) Date: Sep. 2, 2014

(87) PCT Pub. No.: WO2013/127509
PCT Pub. Date: Sep. 6, 2013

(65) Prior Publication Data
US 2015/0046132 A1 Feb. 12, 2015

(30) Foreign Application Priority Data
Mar. 2, 2012 (DE) .......................... 10 2012 004 258

(51) Int. Cl.
*B60W 50/00* (2006.01)
*B60W 40/105* (2012.01)
(Continued)

(52) U.S. Cl.
CPC ......... *B60W 50/0097* (2013.01); *B60W 40/105* (2013.01); *B60W 40/107* (2013.01); *B60W 40/09* (2013.01); *B60W 2050/0005* (2013.01); *B60W 2050/0089* (2013.01); *B60W 2520/10* (2013.01);
(Continued)

(58) Field of Classification Search
None
See application file for complete search history.

(56) References Cited

U.S. PATENT DOCUMENTS 5,913,917 A * 6/1999 Murphy ........................ 701/123
8,290,695 B2 * 10/2012 Hiestermann et al. ........ 701/119
(Continued)

FOREIGN PATENT DOCUMENTS

DE 10 2007 047 178 A1 4/2008
DE 10 2007 007 955 A1 8/2008
(Continued)

OTHER PUBLICATIONS

Office Action issued Nov. 19, 2012 for corresponding German Patent Application No. 10 2012 004 258.2.
(Continued)

*Primary Examiner* — Kamini S. Shah
*Assistant Examiner* — Jay B Hann
(74) *Attorney, Agent, or Firm* — Staas & Halsey LLP

(57) ABSTRACT

A method and a device determine a prediction quality for a predicted energy consumption of a motor vehicle. By determining a prediction quality, a tolerance band is calculated in addition to the predicted driving profile. The prediction quality provides a statement about the entire route as to whether a driver remains in a tolerance band that is based on stochastic evaluation and is naturally occurring. As long as the driver remains in the predicted tolerance band of the driving profile during the real drive, no re-calculation or change of the operating strategy is necessary. Fuel consumption is minimized using the predictive operating strategy on the specified distance.

16 Claims, 3 Drawing Sheets

Predicted energy consumption and prediction quality

(51) Int. Cl.
 *B60W 40/107* (2012.01)
 *G01C 21/34* (2006.01)
 *B60W 40/09* (2012.01)

(52) U.S. Cl.
 CPC ...... *B60W 2550/13* (2013.01); *B60W 2550/141* (2013.01); *B60W 2550/142* (2013.01); *B60W 2550/145* (2013.01); *B60W 2550/402* (2013.01); *G01C 21/3469* (2013.01); *Y02T 10/84* (2013.01)

(56) References Cited

U.S. PATENT DOCUMENTS

| | | | |
|---|---|---|---|
| 8,370,012 B2* | 2/2013 | Yamada et al. | 701/22 |
| 8,554,473 B2* | 10/2013 | Arcot et al. | 701/424 |
| 8,825,243 B2* | 9/2014 | Yang et al. | 701/22 |
| 2007/0219683 A1 | 9/2007 | Daum et al. | |
| 2010/0087977 A1 | 4/2010 | Bonne | |
| 2010/0235030 A1 | 9/2010 | Xue et al. | |
| 2011/0166731 A1* | 7/2011 | Kristinsson et al. | 701/22 |
| 2012/0035791 A1 | 2/2012 | Bottlang et al. | |
| 2013/0073113 A1* | 3/2013 | Wang et al. | 701/1 |
| 2013/0261970 A1 | 10/2013 | Papajewski et al. | |

FOREIGN PATENT DOCUMENTS

| | | |
|---|---|---|
| DE | 10 2007 036 794 A1 | 2/2009 |
| DE | 10 2007 059 120 A1 | 6/2009 |
| DE | 10 2008 035 944 A1 | 4/2010 |
| DE | 10 2008 055 656 A1 | 5/2010 |
| DE | 10 2009 014 591 A1 | 10/2010 |
| DE | 10 2010 015 342 A1 | 10/2011 |
| DE | 10 2012 004 258.2 | 3/2012 |
| DE | 10 2010 047 080 A1 | 4/2012 |
| WO | WO 2009/071369 A1 | 6/2009 |
| WO | PCT/EP2013/00531 | 2/2013 |

OTHER PUBLICATIONS

International Search Report mailed Jan. 23, 2014 for corresponding International Patent Application No. PCT/EP2013/000531.

WIPO provided English translation of Written Opinion of the International Searching Authority for corresponding International Patent Application No. PCT/EP2013/000531.

WIPO provided English translation of International Preliminary Report on Patentability mailed Sep. 12, 2014 for corresponding International Patent Application No. PCT/EP2013/000531.

Machine English Translation of "Fundamentals of measurement—Part 3, evaluation of Measurements of a single measure—Uncertainty," Norm DIN (German Institute for Standardization), No. 1319-3, May, 1996 Machine.

Machine English Translation of "Fundamentals of measurement—Part 4, evaluation of Measurements of a single measure—Uncertainty," Norm DIN (German Institute for Standardization), No. 1319-4, Feb. 1999 Machine.

* cited by examiner

Exemplary extract from a speed profile with some occurring maneuver classes

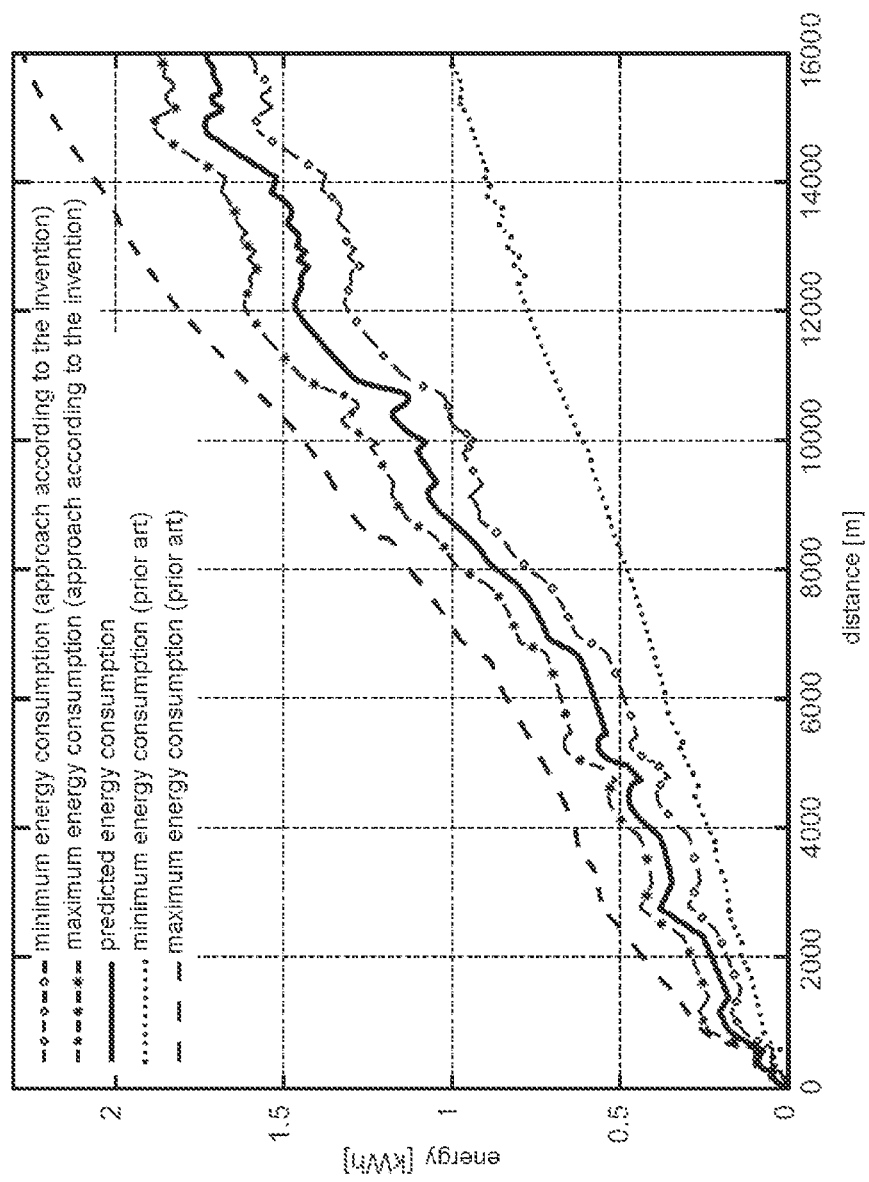

METHOD AND DEVICE FOR DETERMINING A PREDICTION QUALITY FOR A PREDICTED ENERGY CONSUMPTION OF A MOTOR VEHICLE

CROSS REFERENCE TO RELATED APPLICATIONS

This application is based on and hereby claims priority to International Application No. PCT/EP2013/000531 filed on Feb. 23, 2013 and German Application No. 10 2012 004 258.2 filed on Mar. 2, 2012, the contents of which are hereby incorporated by reference.

BACKGROUND

The present invention relates to a method and a device for determining a prediction quality for a predicted energy consumption of a motor vehicle.

Current sensor data are currently predominantly used for controlling the drive train during engine control or in the operating strategy of motor vehicles, especially of electrified vehicles or hybrid vehicles, but the entire planned travel route is not taken into account. This is a disadvantage insofar as no optimal adaptation of the engine control or operating strategy to the planned route can be carried out.

Various methods have been developed in order to overcome said disadvantage. Thus e.g. a method for optimizing the driving mode of a motor vehicle based on a plurality of parameters is known from DE 10 2008 035 944 A1, wherein a travel route of the vehicle is determined by specifying a destination, a plurality of different route parameters that are characteristic of a profile of the determined travel route of the vehicle between the geometric location or a starting point of the vehicle journey and the destination, are determined, and at least one travel condition is determined that is characteristic of the determined travel route of the vehicle between the geometric location of the vehicle or the journey starting point and the destination. Taking into account the route parameters and the travel condition, a target speed of travel of the vehicle along the determined travel route is determined, wherein the travel route is divided into a plurality of segments and the division of the travel route into segments takes place based on the route parameters and/or the travel condition.

A method and a device for determining the driving strategy of a motor vehicle is known from DE 10 2007 036 794, wherein for a specified travel route a corridor for a possible target speed of travel with an upper and a lower speed limit is defined over the travel route.

And a method for obtaining a data record is proposed in the unpublished DE 10 2010 047 080.5, in which the method reproduces the predicted speed of a vehicle over a plurality of points of a route or alternatively associates the speed with points in time that are defined in relation to travel on the route. The data record results in total in a speed profile for both alternatives.

The method for obtaining a data record according to DE 10 2010 047 080.5, which reproduces the predicted speed of a vehicle over a plurality of points of a route or of points in time when travelling the route as a speed profile, contains:

a) Providing a first data record, with which a plurality of routes are associated with route points,
b) Providing a second data record, with which a plurality of processes are defined, with which at least one input speed and one output speed are associated as defining variables,
c) Selecting a predetermined route using the first data record,
d) Determining a provisional speed profile for a journey of a vehicle over the predetermined route,
e) Dividing the route into route segments, each with an associated process from the processes defined in the second data record, using the provisional speed profile, and
f) Determining a speed profile for each associated process in e), wherein the determination takes place for individual processes or for groups of processes having successive processes, and for at least one of the individual processes or groups of processes it is hereby taken into account which process or which group of processes takes place before or afterwards.

According to DE 10 201 0 047 080.5, initially a first data record is provided that associates route points with a plurality of routes or (partial) routes (possibly on a complete road network). Further, a second data record is provided, with which a plurality of processes is defined, wherein at least one input speed and one output speed are provided as defining variables. Within the context of providing the second data record, preferably only such processes are defined that each actually occur in accordance with its definition or at least in a similar form. For example, a process in which a vehicle accelerates from 0 km/h to 53 km/h, such as is characteristic of the acceleration at a traffic light in town after switching to "Green". Or a process of the acceleration from 53 km/h to 85 km/h if the driver of the vehicle is leaving the city and there is a speed restriction of 80 km/h. Or an acceleration from 85 km/h to 130 km/h on the on ramp of a highway. The actual process of acceleration from 0 km/h to 130 km/h can thus comprise a plurality of partial processes.

According to DE 10 201 0 047 080.5, a selection of a predetermined route takes place and a provisional speed profile is determined for the route for the journey of a certain vehicle over the predetermined route. The division of the route, especially the complete division of the route, into route segments takes place, and indeed such that a process from the processes defined in the second data record is associated with each route segment. The division of the route takes place using the provisional speed profile. This enables a definitive speed profile to be obtained. With the method according to DE 10 2010 047 080.5, a speed profile is determined for each process for this purpose. That which takes place outside of a process is especially at least partly taken into account here. Thus for one thing a plurality of processes can be combined to form a group of processes, so to speak a new process, and a speed profile is associated with the entire group of processes.

According to DE 10 201 0 047 080.5, in at least one case the determined speed profile has the appearance that significantly depends on the adjacent process (or the adjacent group of processes). For example, the same constant speed from the provisional speed profile can be assigned differently depending on how the journey proceeds. When travelling at 40 km/h in town one regularly stops at traffic lights, i.e. brakes completely to 0 km/h. When travelling at 40 km/h out of town, a subsequent acceleration can take place such that the driver always accelerates a little in advance and then decelerates lightly again.

DE 10 2010 047 080.5 makes use of the concept of a "process", with which an input speed and an output speed are associated; the concept is introduced of defining situational contexts. The use of the concept of a "process" also goes beyond associating an average time to simple determined routes and associating the same to a determined branch in a graphical tree that symbolically reproduces the road network.

The totality of the processes can and should especially have the property that travelling along a route can actually be divided into a plurality of processes without undefined situations remaining.

The concept of the process can be reflected by the concept of simple acceleration over a defined route, possibly with a defined gradient, (or simple constant travel or a simple deceleration) and by more complex contexts. Thus defining the processes is preferably arranged so that a speed profile that comprises a non-linear segment is determined between the input speed and the output speed for at least some of the processes. To some extent, intermediate values for the speed are specified, and these do not simply originate from a linear relationship. For example, a process can be associated with a driving maneuver in which the driver of the vehicle is travelling round a turn: he initially brakes the vehicle slightly, but then accelerates again out of the turn to the next straight line travel. By the measure of providing intermediate values for the speed, especially even conditions outside the highway can come into consideration. Thus a process can also take into account a statistically fluctuating variable in some respects: the vehicles may have to come to a complete stop before a traffic light, but it can also be that the vehicle actually accelerates slightly in order to be able to drive across the traffic light. That which takes place on average can be represented by a defined process in which braking takes place e.g. to a speed of >0 km/h, wherein accelerating then takes place again.

Also in DE 10 2010 047 080.5 a new type of modeling of a typical journey is proposed, in which a constant speed is desired: In reality the actual speed fluctuates slightly about the desired speed; this can be represented in a model by an oscillatory change of the speed. Thus preferably in the non-linear segment a linear profile of the speed is superimposed by an oscillatory profile of the speed. Equally, a speed profile can also be specified in which a segment with linearly varying speed is interrupted by a segment in which the speed is increased or reduced spontaneously, especially to the extent that is possible within the scope of vehicle control. Preferably, following the interruption the process returns to the interrupted linear profile, either at a speed value at which the interruption took place or at a speed that would have occurred by continuing the linear profile over time without the interruption.

The method according to DE 10 2010 047 080.5 preferably includes that a plurality of routes are travelled and measurement values for vehicle speed are obtained during this at defined points of a route. The experience indirectly reflected in the measurement values is then made visible in a direct manner by defining a number (but preferably a finite number) of processes with which an input speed and an output speed are associated, and indeed the definition takes place based on the measurement values obtained.

From DE 10 2010 047 080.5 the known measure for distinguishing between a plurality of driving styles can be used particularly effectively. A plurality of driving styles can be assigned in the second data record (if sufficient data material are available). Certain processes can then be defined that match a defined driving style. By the determination of the driving style (selecting or assigning) it is then clear how many processes are relevant. Only one process from the processes in the second data record defined for exactly this driving style is assigned to each route segment.

Preferably, according to DE 10 2010 047 080.5, in addition the selected or assigned driving style is also already taken into account when determining the provisional speed profile. (For example, it can be assumed that with a certain driving style the maximum permitted speed will be exceeded by a defined amount etc., whereas with a different driving style it is assumed that an effort is made to exactly maintain the maximum permitted speed.)

With a preferred aspect according to DE 10 2010 047 080.5, information about the type of roads is also included in the data record provided in a) in a known manner, and said information is preferably also taken into account in f). The same applies to taking into account an input altitude and an output altitude, possibly also a gradient.

For later determination of the energy consumption when travelling the predetermined route, according to DE 10 2010 047 080.5 it can be helpful to determine the power to be applied to the wheels of the motor vehicle travelling the route using the final speed profile, and indeed in association with the points of a route or points in time at which the data of the data record are specified for the speed profile.

Using the final speed profile, in addition a number for specifying the quality of the prediction can be determined.

The method according to DE 10 2010 047 080.5 is preferably carried out within the context of operating a navigation device in a motor vehicle, but the use of alternative data processing devices is conceivable. In principle it is true that the first and second data records are stored in a memory of a motor vehicle, that c) is carried out using a control device in the motor vehicle and d) to f) are performed by a data processing of the motor vehicle.

As can be seen from the above representation, a forecast of a driving profile has always been based on data from a database and thus always comprises deviations from the real driving profile. A forecast can, however, only be optimally used if its quality is also known. Such a quality criterion did not previously exist.

SUMMARY

One potential object is to overcome the disadvantages of the related art.

The inventors propose a method determining a prediction quality for a predicted energy consumption of a motor vehicle comprises the following:
a) Providing a plurality of maneuver classes, to which at least one input speed and one output speed of a vehicle are assigned as defining variables;
b) Repeated implementation of the maneuver of each maneuver class by a driver with the vehicle and determining average values for speed or change of speed depending on the number of repetitions of the maneuver;
c) Repetition of b) at least until a statistically meaningful average value for speed or change of speed is obtained for each maneuver;
d) Computation of a tolerance range for the average values of each maneuver with maximum and minimum values for the average speed or the average acceleration depending on the number of repetitions of each maneuver;
e) Selecting a predetermined route using a second data record, by which a plurality of routes with a plurality of route segments are defined;
f) Assigning at least one maneuver class to each segment of the route;
g) Computing the predicted energy consumption for the route by the addition of the predicted energy consumption of the vehicle for each maneuver carried out along each route segment using the determined, statistically meaningful average value for speed or change of speed for each maneuver, and h) Computing a tolerance band for the maximum and minimum energy consumption by the addition of the energy consumption of the vehicle for each maneuver carried out along each route segment using the maximum and minimum average values for the speed or the acceleration determined in d) depending on the number of repetitions of the maneuver, wherein deviations within and/or between different maneuver classes are compensated by using the formula for the Gaussian error propagation.

According to a first advantageous development of the method, the data obtained in b) to d) for each maneuver class are stored in a first data record. This enables it to be ensured that said data are permanently available for further use.

According to another advantageous development of the method, a recalculation or an amendment of the operating strategy of the vehicle only takes place if the actual energy consumption of the vehicle has a value outside the computed tolerance band. While the driver remains in the predicted tolerance band of the travel profile during a real journey, no recalculation or amendment of the operating strategy is necessary. The fuel consumption (e.g. of electrical current, fuel containing hydrocarbons, such as gasoline, diesel, natural gas, liquid gas and/or hydrogen) is minimized using the predictive operating strategy on the specified route.

According to yet another advantageous development of the method, the first and the second data record are stored in a memory of a motor vehicle, e) takes place with the aid of a control device in the motor vehicle, and b) to d) and f) to h) are carried out with the aid of a data processing device of the motor vehicle.

According to yet another advantageous development of the method, the recalculation or amendment of the operating strategy of the vehicle is carried out by a data processing device of the motor vehicle.

Yet another advantageous development of the method provides that the data record provided in the above e) also contains information about the type of roads, and said information is taken into account in the above f).

As provided according to yet another advantageous development of the method, the data record provided in the above e) can also contain information about the altitude of route segments and said information is taken into account in f) above.

The inventors also propose a device with a memory, a control device and a data processing device, wherein
a) a plurality of maneuver classes, with which at least one input speed and one output speed of a vehicle are associated as defining variables, are stored in the memory;
b) average values for speed or change of speed depending on the number of repetitions of the maneuver, which are determined by repeated implementations of the maneuver of each maneuver class with the vehicle by a driver, are stored in the memory;
c) a statistically meaningful average value for speed or change of speed, which is obtained by the sufficiently frequent repetition of each maneuver, is stored in the memory for each maneuver;
d) a tolerance range for the average values of each maneuver with maximum and minimum values for the average speed or the average acceleration depending on the number of repetitions of each maneuver is stored in the memory;
e) a second data record, by which a plurality of routes with a plurality of route segments are defined, is stored in the memory;
f) a predetermined route can be selected by the control device using the second data record, by which a plurality of routes with a plurality of route segments are defined;
g) at least one maneuver class can be assigned to each segment of the route by the data processing device;
h) the predicted energy consumption for the route can be computed by the data processing device by the addition of the predicted energy consumption of the vehicle for each maneuver carried out along each route segment using the determined, statistically meaningful average value for speed or change of speed for each maneuver, and
i) a tolerance band for the maximum and minimum energy consumption can be computed by the data processing device by the addition of the energy consumption of the vehicle for each maneuver carried out along each route segment using the maximum and minimum average values for the speed or the acceleration of each maneuver depending on the number of repetitions of the maneuver, wherein deviations within and/or between different maneuver classes are compensated by using the formula for the Gaussian error propagation.

A first advantageous development of the device provides that the data processing device is further arranged to carry out a recalculation or change of the operating strategy of the vehicle if the actual energy consumption of the vehicle has a value outside of the predicted tolerance band.

According to another advantageous development of the device, the data record stored in the memory, by which a plurality of routes with a plurality of route segments are defined, also contains information about the type of roads and the data processing device is arranged to take into account said information in point g).

According to yet another advantageous development of the device, the data record stored in the memory, by which a plurality of routes with a plurality of route segments are defined, also contains information about the altitude of route segments and the data processing device is arranged to take said information into account in point g).

Finally, the inventors also propose a motor vehicle with a device such as that proposed herein.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 shows an example of a predicted energy consumption and a prediction quality.

DETAILED DESCRIPTION OF THE PREFERRED EMBODIMENT

Figure 1:
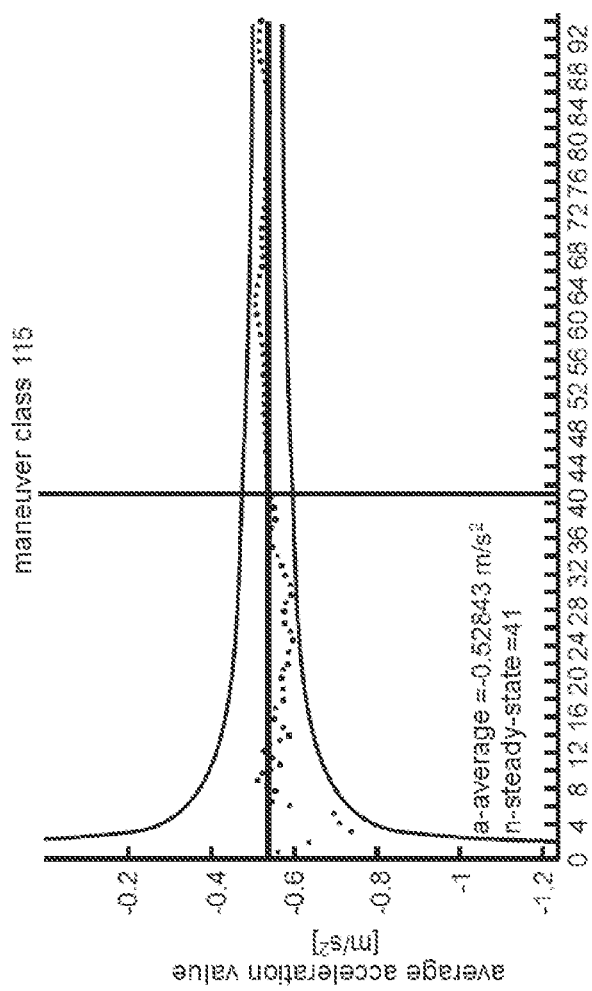
FIG. 1 shows an image of an average deceleration depending on the number of maneuvers carried out and the steady-state value.

Reference will now be made in detail to the preferred embodiments of the present invention, examples of which are illustrated in the accompanying drawings, wherein like reference numerals refer to like elements throughout.

By the inventors' proposals, in addition to the predicted driving profile a tolerance band is also computed by determining a tolerance band, the so-called prediction quality. The prediction quality provides an indication for the entire route as to whether a driver is maintaining a tolerance band that is based on a stochastic analysis and that is naturally occurring. The operating strategy for the vehicle takes into account just said tolerance band in the optimization.

While the driver stays within the predicted tolerance band of the travel profile during the real journey, no recalculation or amendment of the operating strategy is necessary. The fuel consumption is hereby minimized using the predictive operating strategy on the specified route.

As described e.g. in the unpublished DE 10 2010 047 080.5, the speed profile of each route can be described by defined maneuver classes (referred to in DE 10 2010 047 080.5 as "processes"). As examples of such maneuver classes, an acceleration from 50 to 100 km/h, constant travel at 70 km/h or a deceleration from 50 to 30 km/h are mentioned here. According to previous knowledge, a number of about 100 different maneuvers is sufficient for the speed profile of any route to be described sufficiently accurately. Each maneuver class contains at least one input speed and one output speed of a vehicle as defining variables.

According to the proposal, an analysis is carried out for each maneuver class, with which the average speed or average change of speed of a driver with a vehicle is stored. The values determined during the analysis are preferably stored in a so-called maneuver class matrix.

As is shown in FIG. 1, the average value (indicated by dots), i.e. the value for the average speed or average change of speed for a small number of maneuvers based on the small sample, fluctuates significantly. With an increasing number of maneuvers, however, said average value approaches a fixed value. The stochastically computed steady-state value (n=41) shown in FIG. 1 by a vertical line represents the minimum number of times that a maneuver must be performed in order to obtain a statistically meaningful average value for the average speed or average acceleration of the maneuver.

The steady-state value can be computed according to the formula for the "minimum sample size":

$$n_{steady-state} = t_{0.995}^2 \cdot \frac{s_{a_\phi}^2}{b_a^2} \text{ or } n_{steady-state} = t_{0.995}^2 \cdot \frac{s_{v_\phi}^2}{b_v^2}$$

As is further shown in FIG. 1, a tolerance band (indicated by solid lines) is determined for the average values. A maximum value and a minimum value for the average acceleration or average speed are thereby given depending on how often a maneuver takes place. The computation of the limits takes place with the aid of the stochastic approach to "measurement uncertainty". Said measurement uncertainty indicates the region about the average value in which a value lies with a previously determined probability depending on the measurement values.

$$a_{\phi,max}/a_{\phi,min} = \overline{a}_\phi \pm \Delta a_\phi = \overline{a}_\phi \pm t_a \cdot \frac{s_{a_\phi}}{\sqrt{n}} = \overline{a}_\phi \pm t_a \cdot s_{\overline{a}_\phi}$$

or $$v_{\phi,max}/v_{\phi,min} = \overline{v}_\phi \pm \Delta v_\phi = \overline{v}_\phi \pm t_v \cdot \frac{s_{v_\phi}}{\sqrt{n}} = \overline{v}_\phi \pm t_v \cdot s_{\overline{v}_\phi}$$

Figure 2:
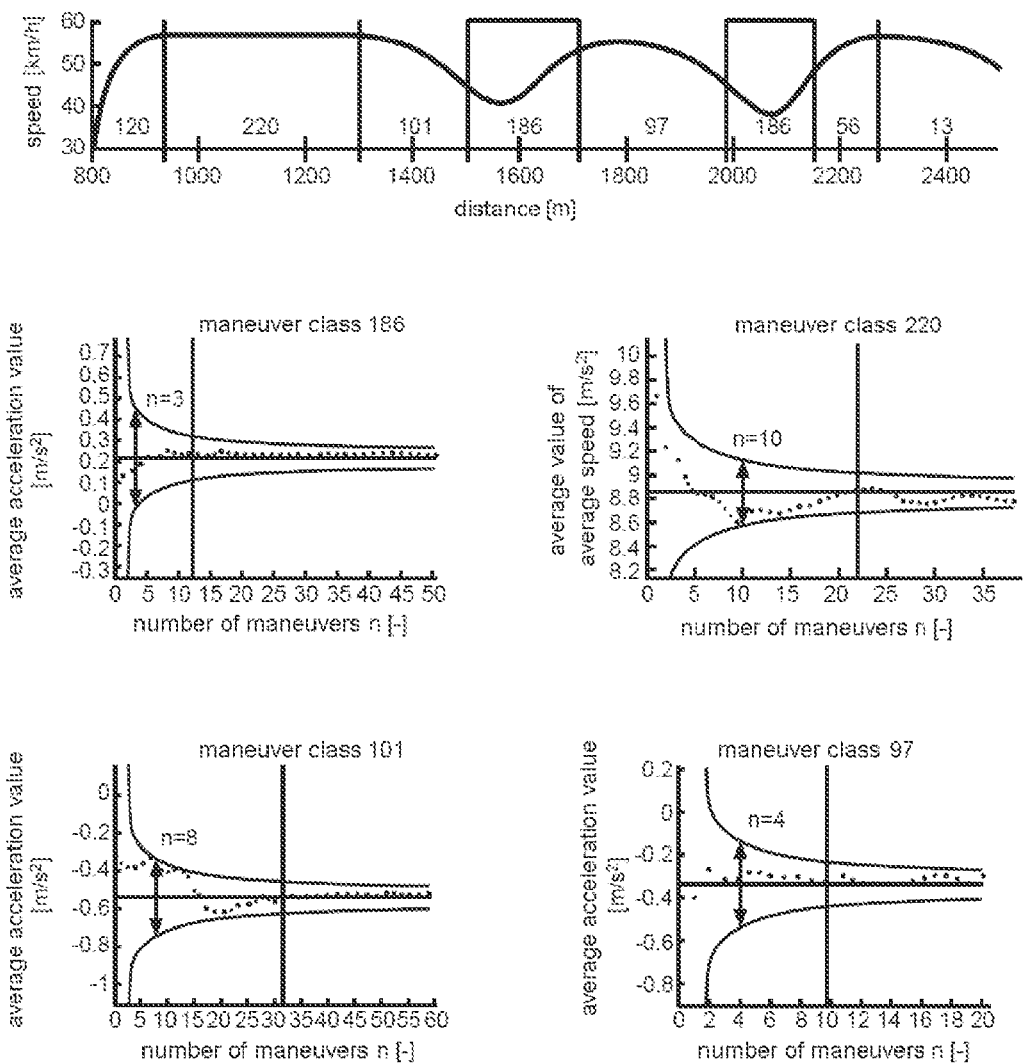
FIG. 2 shows an exemplary extract from the speed profile with maneuver classes occurring therein.

As is illustrated in the top image in FIG. 2, the algorithm interprets the speed profile of any route as a succession of maneuver classes. In the present example it is a succession of maneuver classes 120, 220, 101, 186, 97, 186, 56 and 13.

An average value (of speed or acceleration) and the stochastic maximum deviations to be accepted can thus be predicted for each segment of a route.

As is shown in FIG. 3, an energy consumption over the route can be predicted with the average values (average value for n=steady state) using the equations for the driving resistances.

With the deviations to be accepted and a newly developed stochastic approach, which is based on the "Gaussian error propagation", the deviations that can arise from the predicted energy consumption can be predicted.

The "Gaussian error propagation" is computed from the following formula:

$$\Delta f = \sqrt{\sum_{i=1}^n \left(\frac{\delta f}{\delta x_i}\bigg|_{x_i} \cdot \Delta x_i\right)^2}$$

wherein $x_i$ represents the individual measurement variables that are included in the final value that is computed by the function f. In the energy computation, the steady-state values of the speed or the acceleration of the individual maneuver classes represent the measurement variables. If the maneuver class is an acceleration or deceleration, the energy is computed as follows:

$$\sum E = E_{MKx} + E_{MKy} + E_{MKz} + \ldots =$$
$$= \sum ((k_{m_{rot}} + m_{Fzg}) \cdot a_{steady-state} + m_{Fzg} \cdot g \cdot \sin(\tan^{-1}(\Delta h/\Delta s)) +$$
$$F_0 + F_1 \cdot v_\phi + F_2 \cdot v_\phi^2) \cdot \Delta s \cdot \eta$$
$$= \sum ((k_{m_{rot}} + m_{Fzg}) \cdot a_{steady-state} + m_{Fzg} \cdot g \cdot \sin(\tan^{-1}(2 \cdot a_{steady-state} \cdot$$
$$\Delta h/(v_E^2 - v_A^2))) + F_0 + F_1 \cdot v_\phi + F_2 \cdot v_\phi^2) \cdot \left(\frac{v_E^2 - v_A^2}{2 \cdot a}\right) \cdot \eta$$

with $\Delta s = \frac{v_E^2 - v_A^2}{2 \cdot a_{steady-state}}$ from $v_E = \sqrt{v_A^2 + 2 \cdot a_{steady-state} \cdot \Delta s}$ The following is calculated as a partial derivative with respect to $a_{steady-state}$:

$$\sum \frac{\delta E}{\delta a_{steady-state}} =$$
$$\sum \left(\left((k_{m_{rot}} + m_{Fzg}) + m_{Fzg} \cdot g \cdot \cos\left(\tan^{-1}\left(\frac{2 \cdot a_{steady-state} \cdot \Delta h}{v_E^2 - v_A^2}\right)\right)\right) \cdot$$
$$\left(\frac{1}{1 + \left(\frac{2 \cdot a_{steady-state} \cdot \Delta h}{v_E^2 - v_A^2}\right)^2}\right) \cdot \left(\frac{2 \cdot \Delta h}{v_E^2 - v_A^2}\right) \cdot$$
$$\left(\frac{v_E^2 - v_A^2}{2 \cdot a_{steady-state}}\right) + \left((k_{m\_rot} + m_{Fzg}) \cdot a_{steady-state} +$$
$$m_{Fzg} \cdot g \cdot \sin\left(\tan^{-1}\left(\frac{2 \cdot a_{steady-state} \cdot \Delta h}{v_E^2 - v_A^2}\right)\right)\right) +$$
$$F_0 + F_1 \cdot v_\phi + F_2 \cdot v_\phi^2\right) \cdot \left(-\frac{v_E^2 - v_A^2}{2 \cdot a^2}\right)\right) \cdot \eta =$$

-continued $$\sum \left( \left( (k_{m_{rot}} + m_{Fzg}) + m_{Fzg} \cdot g \cdot \cos\left(\tan^{-1}\left(\frac{\Delta h}{\Delta s}\right)\right) \right) \cdot \right.$$
$$\left. \left( \frac{1}{1+\left(\frac{\Delta h}{\Delta s}\right)^2} \right) \cdot \left( \frac{2 \cdot \Delta h}{v_E^2 - v_A^2} \right) \right) \cdot \Delta s +$$
$$\left( (k_{m\_rot} + m_{Fzg}) \cdot a_{beharrung} + m_{Fzg} \cdot g \cdot \sin\left(\tan^{-1}\left(\frac{\Delta h}{\Delta s}\right)\right) \right) +$$
$$\left. F_0 + F_1 \cdot v_\phi + F_2 \cdot v_\phi^2 \right) \cdot \left( -\frac{v_E^2 - v_A^2}{2 \cdot a^2} \right) \right) \cdot \eta$$

For constant travel the energy is calculated by $\Sigma E = E_{MKx} + E_{MKy} + E_{MKz} + \ldots = \Sigma(m_{F2g} \cdot g \cdot \sin(\tan^{-1}(\Delta h/\Delta s)) + F_0 + F_1 \cdot v_{steady\text{-}state} + F_2 \cdot v_{steady\text{-}state}^2) \cdot \Delta s \cdot \eta$ A partial derivative with respect to $v_{steady\text{-}state}$ gives:

$$\sum \frac{\delta E}{\delta v_{steady\text{-}state}} = (2 \cdot F_2 \cdot v_{steady\text{-}state} + F_1) \cdot \Delta s \cdot \eta$$

The possible deviations of the predicted total energy consumption $\Sigma E$ are then calculated from the individual terms for the maneuver classes:

$$\Delta \sum E = \sqrt{\sum \left. \frac{\delta E}{\delta a_{steady\text{-}state}} \right|_{a_{steady\text{-}state}} \cdot \Delta a_\phi + \sum \left. \frac{\delta E}{\delta v_{steady\text{-}state}} \right|_{v_{steady\text{-}state}} \cdot \Delta v_\phi}$$

The analysis takes place step-by-step, i.e. a new term is added after each maneuver class. The value for the measurement uncertainty $\Delta \alpha_\phi$ or $\Delta v_\phi$ is obtained depending on the number of the maneuver class, such as can be seen e.g. from FIG. 1.

If a maneuver class only occurs once during the journey, the value for n=1 is used. Once the maneuver class occurs a second time, the value for n=2 is used for both terms, the value for the measurement uncertainty and thus the predicted deviation is therefore smaller. It is thus noted that the average value for the acceleration or speed of a maneuver class approaches ever closer to the steady-state value with the increasing number. In reality this means that during a journey the driver, in statistical terms, alternately accelerates harder or less hard because of external and internal influences, such as traffic jams or rush-hour traffic. However, this balances out more, the more often he performs said acceleration. In addition, it is noted that deviations within and/or between different maneuver classes compensate each other by the quadratic addition of the formula for the Gaussian error propagation. By using this approach, the deviations to be tolerated only increase slightly over the route, and occasionally the tolerance band becomes even narrower through the compensation.

A tolerance band, the so-called prediction quality, can thus be applied about the predicted energy consumption by the approach described above, as shown in FIG. 3. The deviations from the predicted energy consumption that lie within the tolerance band of the approach can be tolerated and do not necessitate recalculation or amendment of the operating strategy.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for determining a prediction quality about a predicted energy consumption of a motor vehicle, the method comprising:
   defining a plurality of maneuvers for the vehicle, each maneuver having an associated input speed and an associated output speed;
   repeatedly performing each maneuver by a driver of the vehicle to obtain a plurality of speed values or a plurality of change of speed values, each speed value representing an average vehicle speed during a performance of the maneuver, each change of speed value representing an average change of speed during a performance of the maneuver;
   for each maneuver, obtaining an average value by averaging the plurality of speed values or the plurality of change of speed values;
   for each maneuver, continuing to repeatedly perform the maneuver until a statistically meaningful average value for speed or change of speed is obtained;
   for each maneuver, computing a tolerance range for the speed value or the change of speed value, the tolerance range being defined by a maximum expected average speed or acceleration during the maneuver and by a minimum expected average speed or acceleration during the maneuver;
   selecting a chosen route from a plurality of predetermined routes defined in a data record, each predetermined route having a plurality of route segments;
   assigning a maneuver to each segment of the chosen route such that a plurality of maneuvers are assigned to the chosen route;
   predicting energy consumption for the chosen route by adding, for each maneuver assigned to the chosen route, a predicted energy consumption of the vehicle determined using a respective statistically meaningful average value for speed or change of speed; and
   computing a tolerance band for energy consumption, the tolerance band being defined by a maximum and a minimum expected energy consumption, the maximum expected energy consumption being determined by adding, for each maneuver assigned to the chosen route, a predicted energy consumption of the vehicle determined using the maximum expected average speed or acceleration, the minimum expected energy consumption being determined by adding, for each maneuver assigned to the chosen route, a predicted energy consumption of the vehicle determined using the minimum expected average speed or acceleration, wherein deviations within and/or between different maneuvers are compensated by using the formula for the Gaussian error propagation.

2. The method as claimed in claim 1, wherein
   the plurality of speed or change of speed values, the statistically meaningful average value and the tolerance range for each maneuver are stored in a first data record, and the plurality of predetermined routes are defined in a second data record.

3. The method as claimed in claim 1, wherein
the statistically meaningful average value and the tolerance range for each maneuver are stored in a first data record, and
the plurality of predetermined routes are defined in a second data record.

4. The method as claimed in claim 1, wherein the statistically meaningful average value and the tolerance range are recalculated if the vehicle has an actual energy consumption that falls outside the tolerance band.

5. The method as claimed in claim 1, wherein a recalculation of the statistically meaningful average value and the tolerance range is performed only if the vehicle has an actual energy consumption that falls outside the tolerance band.

6. The method as claimed in claim 3, wherein
the first and second data records are stored in a memory of the vehicle,
the chosen route is selected with a control device in the vehicle, and
a data processing device of the vehicle is used to obtain the statistically meaningful average value, to compute the tolerance range, to assign a maneuver to each segment of the chosen route, to predict energy consumption and to compute the tolerance band for energy consumption.

7. The method as claimed in claim 6, wherein
the statistically meaningful average value and the tolerance range are recalculated if the vehicle has an actual energy consumption that falls outside the tolerance band, and
the data processing device of the vehicle is used to recalculate the statistically meaningful average value and the tolerance range.

8. The method as claimed in claim 5, wherein a data processing device of the vehicle is used to recalculate the statistically meaningful average value and the tolerance range.

9. The method as claimed in claim 1, wherein
the plurality of predetermined routes are defined in the data record such that such that each predetermined route has associated information about type of road along the route, and
the information about type of road is used in assigning maneuvers to route segments.

10. The method as claimed in claim 1, wherein
the plurality of predetermined routes are defined in the data record such that each segment of the route has associated information about altitude of the segment, and
the information about altitude is used in assigning maneuvers to route segments.

11. The method as claimed in claim 1, wherein
for each maneuver, after the statistically meaningful average value is obtained, the method stops obtaining the speed values or change of speed values and stops obtaining the average value.

12. A device for a vehicle, comprising:
a memory to store:
    a plurality of maneuvers for a vehicle, each maneuver having an associated input speed and an associated output speed; and
    a plurality of predetermined routes defined in a data record, each predetermined route having a plurality of route segments;
a control device to select a chosen route from the plurality of predetermined routes;
a data processing device to:
    obtain, for each maneuver, an average value for speed or change of speed, the average value being obtained by averaging a plurality of speed values or a plurality of change of speed values, each speed value representing an average vehicle speed during a performance of the maneuver by a driver of the vehicle, each change of speed value representing an average change of speed during a performance of the maneuver by the driver;
    continually average the plurality of speed values or the plurality of change of speed values for each maneuver until a statistically meaningful average value for speed or change of speed is obtained, the statistically meaningful average value being stored in the memory for each maneuver;
    compute a tolerance range for the speed value or the change of speed value, the tolerance range being defined by a maximum expected average speed or acceleration during the maneuver and by a minimum expected average speed or acceleration during the maneuver, the tolerance range of each maneuver being stored in the memory;
    assign a maneuver to each segment of the chosen route;
    predict energy consumption for the chosen route by adding, for each maneuver assigned to the chosen route, a predicted energy consumption of the vehicle determined using a respective statistically meaningful average value for speed or change of speed; and
    compute a tolerance band for energy consumption, the tolerance band being defined by a maximum and a minimum expected energy consumption, the maximum expected energy consumption being determined by adding, for each maneuver assigned to the chosen route, a predicted energy consumption of the vehicle determined using the maximum expected average speed or acceleration, the minimum expected energy consumption being determined by adding, for each maneuver assigned to the chosen route, a predicted energy consumption of the vehicle determined using the minimum expected average speed or acceleration,
    wherein deviations within and/or between different maneuver classes are compensated by using the formula for Gaussian error propagation.

13. The device as claimed in claim 12, wherein the data processing device recalculates the statistically meaningful average value and the tolerance range if the vehicle has an actual energy consumption that falls outside the tolerance band.

14. The device as claimed in claim 12, wherein the data processing device recalculates the statistically meaningful average value and the tolerance range only if the vehicle has an actual energy consumption that falls outside the tolerance band.

15. The device as claimed in claim 12, wherein
the plurality of predetermined routes are defined in the data record stored in the memory such that such that each predetermined route has associated information about type of road along the route, and
the data processing device uses the information about type of road in assigning maneuvers to route segments.

16. The device as claimed in claim 12, wherein
the plurality of predetermined routes are defined in the data record stored in the memory such that such that each segment of the route has associated information about altitude of segment, and
the data processing device uses the information about altitude in assigning maneuvers to route segments.

* * * * *

UNITED STATES PATENT AND TRADEMARK OFFICE
CERTIFICATE OF CORRECTION

| | | |
|---|---|---|
| PATENT NO. | : 9,150,222 B2 | Page 1 of 1 |
| APPLICATION NO. | : 14/382504 | |
| DATED | : October 6, 2015 | |
| INVENTOR(S) | : Jens Papajewski et al. | |

It is certified that error appears in the above-identified patent and that said Letters Patent is hereby corrected as shown below:

In the Claims

Claim 9, Column 11, Line 37

Delete "such that such that" and insert --such that--, therefor.

Claim 15, Column 12, Line 53

Delete "such that such that" and insert --such that--, therefor.

Claim 16, Column 12, Line 60

Delete "such that such that" and insert --such that--, therefor.

Signed and Sealed this
Ninth Day of February, 2016

Michelle K. Lee
*Director of the United States Patent and Trademark Office*